United States Patent
Enicks et al.

(10) Patent No.: US 7,540,298 B2
(45) Date of Patent: *Jun. 2, 2009

(54) SYSTEM, APPARATUS AND METHOD FOR CONTAMINANT REDUCTION IN SEMICONDUCTOR DEVICE FABRICATION EQUIPMENT COMPONENTS

(75) Inventors: Darwin G. Enicks, Colorado Springs, CO (US); Carl E. Friedrichs, Colorado Springs, CO (US); Richard A. Brucher, Divide, CO (US)

(73) Assignee: Atmel Corporation, San Jose, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 11/393,146

(22) Filed: Mar. 29, 2006

(65) Prior Publication Data

US 2006/0169318 A1    Aug. 3, 2006

Related U.S. Application Data (63) Continuation of application No. 10/801,435, filed on Mar. 15, 2004, now Pat. No. 7,044,147.

(51) Int. Cl.
*F16K 11/00*    (2006.01)

(52) U.S. Cl. .................. 137/1; 137/240; 137/565.01; 137/883

(58) Field of Classification Search .......... 137/240, 137/883, 565.01, 1
See application file for complete search history.

(56) References Cited

U.S. PATENT DOCUMENTS

| | | | | |
|---|---|---|---|---|
| 3,888,518 A | 6/1975 | Delessert | .............. | 285/39 |
| 4,352,532 A | 10/1982 | Hardin | .............. | 339/15 |
| 4,383,547 A | 5/1983 | Lorenz et al. | .............. | 137/240 |
| 4,437,479 A | 3/1984 | Bardina et al. | .............. | 134/68 |
| 4,852,516 A | 8/1989 | Rubin et al. | .............. | 118/715 |
| 5,137,047 A | 8/1992 | George | .............. | 137/240 |
| 5,449,294 A | 9/1995 | Rench et al. | .............. | 437/225 |

(Continued)

FOREIGN PATENT DOCUMENTS

WO    WO-2005/091892 A2    10/2005

OTHER PUBLICATIONS

"U.S. Appl. No. 10/801,435, Notice of Allowance mailed Dec. 20, 2005", 4 pgs.

(Continued)

*Primary Examiner*—Kevin L Lee
(74) *Attorney, Agent, or Firm*—Schwegman, Lundberg & Woessner P.A.

(57)    ABSTRACT

A system and apparatus for reducing contaminants of physical components (e.g., semiconductor device fabrication equipment components), featuring a manifold having a passageway in fluid communication with a plurality of inlets and for providing a purge fluid to removably connected components to undergo contaminant reduction. The inlets are coupled to a plurality of manifold valves to which components are removably connected. The manifold valves are operable to place connected components into and out of fluid communication with the inlets and the passageway. A fluid source supplies purge fluid to the manifold and a pump is connected to the manifold to remove fluid from the system. In one embodiment an oven is connected to the system for outgassing and for reduction of moisture in additional components.

28 Claims, 9 Drawing Sheets

U.S. PATENT DOCUMENTS

| | | | |
|---|---|---|---|
| 5,453,124 A | 9/1995 | Moslehi et al. | 118/715 |
| 5,881,476 A | 3/1999 | Strobush et al. | 34/451 |
| 5,992,463 A | 11/1999 | Redemann et al. | 137/884 |
| 6,099,599 A | 8/2000 | Wu | 29/25.01 |
| 6,199,255 B1 | 3/2001 | Wang et al. | 29/239 |
| 6,325,886 B1 | 12/2001 | Harris et al. | 156/314 |
| 6,349,744 B1 | 2/2002 | Grosshart | 137/884 |
| 6,442,867 B2 | 9/2002 | Pressnall et al. | 34/410 |
| 6,598,279 B1 | 7/2003 | Morgan | 29/402.08 |
| 6,607,605 B2 | 8/2003 | Tan | 134/3 |
| 7,044,147 B2 * | 5/2006 | Enicks et al. | 137/1 |

OTHER PUBLICATIONS

"Chinese Application Serial No. 200580015569.4, First Office Action mailed Oct. 26, 2007", (w/ English Translation), 10 pgs.

"Chinese Application Serial No. 200580015569.4, Second Office Action mailed Apr. 4, 2008", (w/ English Translation),5 pgs.

"Chinese Application Serial No. 200580015569.4, Response filed Mar. 6, 2008 to First Office Action mailed Oct. 26, 2007", 31 pgs.

"Chinese Application Serial No. 200580015569.4, Response filed Jun. 18, 2008 to Second Office Action mailed Apr. 4, 2008", 20 pgs.

"International Application Serial No. PCT/US05/06305, International Search Report mailed Jan. 25, 2006", 1 pg.

"International Application Serial No. PCT/US05/06305, Written Opinion mailed Jan. 25, 2006", 3 pgs.

* cited by examiner

SYSTEM, APPARATUS AND METHOD FOR CONTAMINANT REDUCTION IN SEMICONDUCTOR DEVICE FABRICATION EQUIPMENT COMPONENTS

CROSS-REFERENCE TO RELATED APPLICATION

This application is a continuation application of U.S. patent application Ser. No. 10/801,435 filed Mar. 15, 2004, now U.S. Pat. No. 7,044,147, which is hereby incorporated by reference.

FIELD OF THE INVENTION

The invention relates to semiconductor device fabrication equipment in general, and, in particular, to a system, apparatus, and method for contaminant reduction of semiconductor device fabrication equipment components.

BACKGROUND OF THE INVENTION

Semiconductor device fabrication equipment components tend to accumulate contaminants, through for example, adsorption and absorption, before, during, and/or after the operation of the fabrication equipment. Such contaminants include, for example, moisture, oxygen, atmosphere, or any other gases. Possible contaminant sources are process gases as well as the atmosphere. Even components that have been cleaned, by cleaning processes known in the art, or that are new, are subject to accumulation of contaminants. Thus, the components of the semiconductor device fabrication equipment become a source of contaminants, in addition to process gases. Contaminants on components are undesirable for at least the reasons that they degrade the quality of the fabricated semiconductor device manufactured and reduce the efficiency of the fabrication process.

Where the method of semiconductor device fabrication involves depositing epitaxially-grown silicon germanium (SiGe) on a silicon substrate in a chemical vapor deposition (CVD) reactor, during SiGe deposition, oxygen present in the CVD reactor is typically incorporated into the SiGe film. Elevated oxygen levels present in the CVD reaction chamber used to deposit SiGe causes numerous problems in the SiGe films produced in the CVD reactor chamber. Among these problems are elevated sheet resistance of the SiGe p-type base and poor crystal quality.

Additionally, as the amount of absorbed or adsorbed contaminants, such as oxygen, increases, the amount of time for which the reactor must be taken offline typically increases in order to achieve acceptable oxygen levels in SiGe films. While the reactor is offline, it is disassembled to remove contaminants, reassembled, and then tested. The longer the reactor is offline, the less cost effective manufacturing becomes, as an offline reactor cannot be used for manufacturing semiconductor chips.

Also, elevated contaminant levels in the reactor components may lead to early reactor failure and a decreased reactor lifetime.

Therefore, it is an object of the present invention to provide a system, method, and apparatus for reduction or elimination of contaminants found in semiconductor device fabrication equipment components.

It is another object of the present invention to reduce or eliminate levels of contaminants on semiconductor device fabrication equipment components.

It is a further object of the present invention to improve the quality of semiconductor devices manufactured with semiconductor device fabrication equipment.

Additional objects of the present invention are to reduce preventative maintenance recovery time, process recovery time, and mean time to repair (MTTR) and to increase mean time between interrupt (MTBI) and mean time between cleans (MTBC).

SUMMARY OF THE INVENTION

The above and other objects have been met with a method, system, and apparatus each of which, in one exemplary embodiment, feature a manifold which associates a plurality of components together so that they may be selectively placed into and out of fluid communication with fluid, such as a purge fluid, introduced into a main passageway for reducing the amount of contaminants present on surfaces of the components. The purge fluid may include a gas selected from a variety of different types of gases, including nitrogen. The purge fluid may be inert. The manifold has a pair of capped ends, a main passageway, a plurality of inlets in fluid communication with the main passageway, manifold valves connected to the plurality of inlets to which semiconductor device fabrication equipment components are connectable, and an exhaust fitting connected to the manifold at a location downstream from the inlet closest to the capped end. In the system, one of the capped ends is connected to a fluid source and the exhaust fitting is connected to a pump which pumps fluid introduced into the manifold out of the manifold under vacuum. The term vacuum, as referred to in the description of the present invention, means a low pressure environment.

In one embodiment, the system and apparatus further include caps which are connectable to the manifold valves and to a type of component to undergo contaminant reduction having a pair of openings. When a component having two openings, such as a ball valve or a pressure control valve, is connected to a manifold valve for contaminant reduction, one end of the component is connected to the manifold valve at an end having a first opening and the other end of the component having a second opening is capped with a cap to maintain the vacuum within the manifold by preventing atmospheric particles from entering the component and manifold. When the component is a rotation assembly, one end of the rotation assembly including an opening is connected to the manifold valve, while the other end is typically already closed and thus does not require a cap. When a component is not connected to a particular manifold valve, an uncovered manifold valve opening may be capped to maintain the vacuum within the system when the valve is in an open position.

Cap valves may be connected to the caps. When the manifold is in use, a vacuum typically exists within the system. When components are to be removed from the manifold, the cap valve is opened to slowly let air into the component and to vent the component out to atmosphere.

In another embodiment, the system includes an oven connected to the pump for outgassing components of semiconductor device fabrication equipment.

In operation, a purge fluid, such as nitrogen gas, is introduced into the manifold. Nitrogen gas, in particular nitrogen gas introduced in a vacuum, assists in the removal of oxygen from surfaces of the components. Components to undergo contaminant reduction are connected to the manifold valves. In one example, three sets of components (each set including, for example, two of the same type of component and each component having at least one opening) are connected to the manifold valves at the openings. For instance, two rotation assemblies, two ball valves, and two pressure control valves are connected to manifold valves of the system. The inlets of the manifold may be facing downwardly for connection to a manifold valve to which a rotation assembly is to be connected, or frontwardly for connection to a manifold valve to which a ball valve or pressure control valve is to be connected. As stated above, the manifold valves and components may be capped to maintain the vacuum within the system. Fluid is introduced into the main passageway of the manifold and is dispersed to inner surfaces of components via the manifold inlets and connected manifold valves which are in the open position. Fluid is pumped out of the components, inlets, and manifold valves through the exhaust pipe connected to the pump. While the components are undergoing contaminant reduction, additional components may be disposed within the oven for outgassing. When the components have undergone contaminant reduction, they are removed from the system and are ready for use.

The apparatus and system of the present invention is advantageous in at least that it reduces the amount of contaminants, such as oxygen, found on surfaces of semiconductor device fabrication equipment components. A reduction in oxygen within the components will result in an improvement in the quality of semiconductor devices manufactured by the equipment.

Furthermore, the present invention may reduce contaminants of more than one component and more than one type of component at a time. These components may be connected to the manifold valves, found within the oven, or both.

Additionally, reduction of contaminants on components, with the system, apparatus, and method of the present invention, makes future removal of contaminants easier to achieve. Therefore, preventative maintenance recovery time, process recovery time, and mean time to repair (MTTR) are reduced. Further, mean time between interrupt (MTBI) of operation and mean time between cleans (MTBC) will increase as the semiconductor fabrication device equipment will not need to be maintained as often if contaminant reduction has been achieved with the present invention.

The system and apparatus of the present invention may be utilized in conjunction with semiconductor device fabrication equipment components for several different types of semiconductor processes including, for example, SiGe, EPI, thin film, diffusion, etch, and implant processes.

BRIEF DESCRIPTION OF THE DRAWINGS

FIG. 5b is a front view of the manifold of FIG. 2a.
FIG. 6b is an exploded view of FIG. 6a.
FIG. 7b is an exploded view of FIG. 7a.

DETAILED DESCRIPTION OF THE INVENTION

Figure 1:
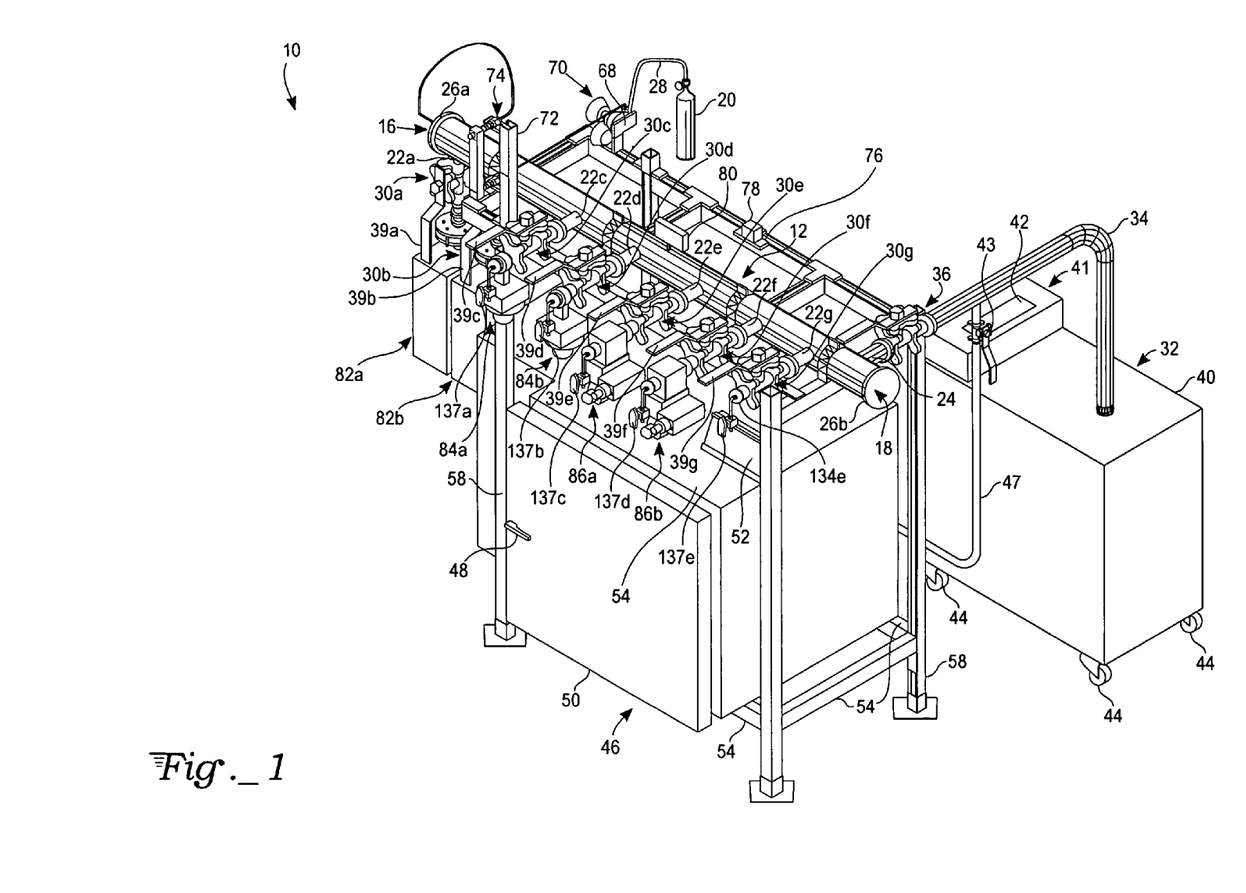
FIG. 1 is a perspective view of the system of the present invention.

With reference to FIG. 1, the system 10 of the present invention is seen featuring a manifold 12. Referring to FIG. 1 and FIGS. 5a-c, the manifold 12 is, for example, a stainless steel pipe, having a length of, for example, 178 cm (70⅛ inches). The manifold 12 includes a main internal passageway 14 capped with first and second capped ends 16 and 18 (cap 18 is not shown in FIG. 5a), the first capped end 16 appearing as capped end 18 except for having an opening (not shown) connected to a fluid source 20, a plurality of inlets 22a-22g disposed in between the capped ends 16 and 18 and in fluid communication with the main passageway 14, and an exhaust fitting 24 disposed proximate to the second capped end 18 and downstream from the plurality of inlets 22a-22g, the exhaust fitting 24 being in fluid communication with the main passageway 14 and the inlets 22a-22g. Capped end 16 includes flange 26a and capped end 18 includes flange 26b. For example, flanges 26a and 26b are NW100 flanges. In one example, each inlet 22 is approximately 5 cm (2 inches) long and has a flange, for example an NW40 flange, that has an opening that is approximately 4 cm (1.6 inches) in diameter. In one example, the exhaust fitting 24 is approximately 8.9 cm (3½ inches) long and has an opening that is approximately 5 cm (1.97 inches) in diameter. Fluid source 20 is connected to the opening of the first capped end via fluid supply line 28.

Figure 2:
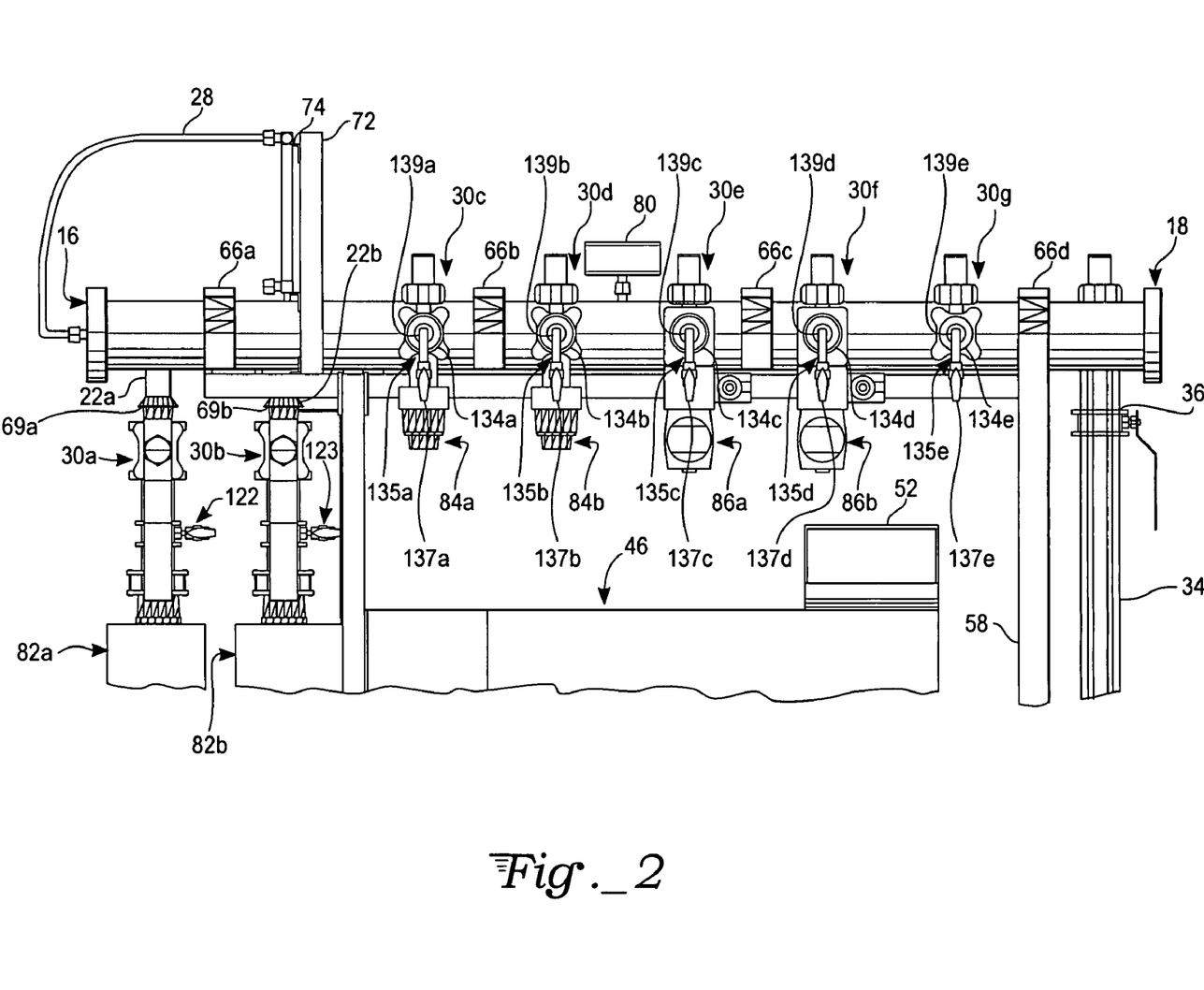
FIG. 2 is a front view of a portion of the system of FIG. 1.
Figure 3:
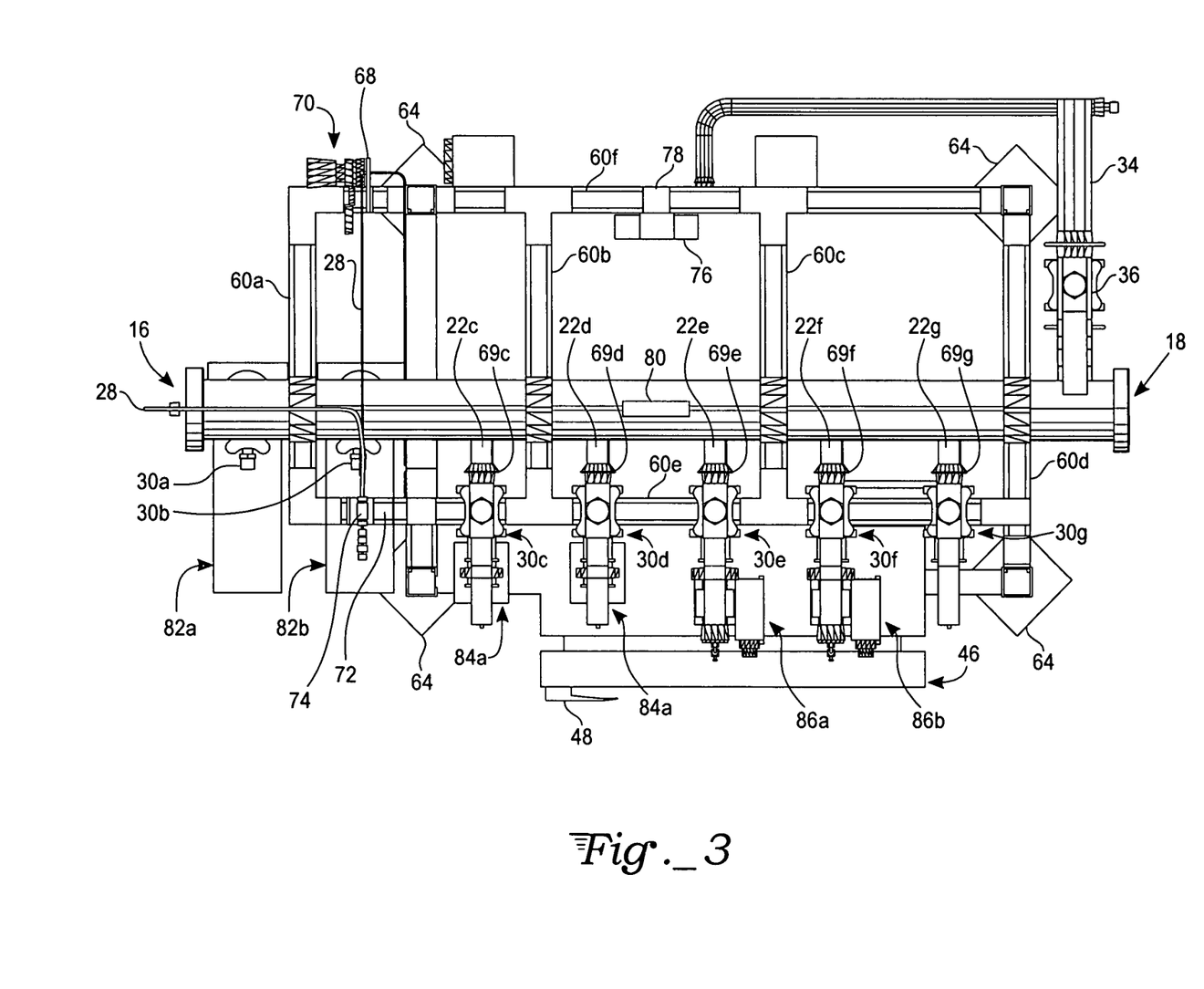
FIG. 3 is a top view of a portion of the system of FIG. 1.

Referring to FIGS. 1-3, a plurality of manifold valves 30a-30g is connected to the manifold inlets 22a-22g respectively. Manifold valves 30a-30g may be connected to inlets 22a-22g via flange connections, or flange joints, 69a-69g (FIGS. 2 and 3). Manifold valves have handles 39a-39g (FIG. 1) which are operated to place the manifold 12 and connected components into and out of fluid communication with the inlets 22 and main passageway 14. The manifold valves 30 are, for example, ball valves. Each manifold valve 30 has a first end connected to one of the plurality of inlets 22a-22g and a second end to which a component is removably connected.

Referring to FIG. 1, a pump 32, for example a roughing pump, is connected to the exhaust fitting 24 via a pipe 34. Other pressure reduction means for providing a reduced pressure within the manifold may be used. A pipe valve 36 is operable to place the exhaust fitting 24 into and out of fluid communication with the pipe 34 and pump 32. A primary pump controller 42, for example an EBARA A70W LCD controller (manufactured by Ebara Corp. Fujisawa, Japan) is seen disposed on the pump body 40 as a part of interface box 41. Wheels 44, which assist in transport of the pump 32, are connected to the pump body 40. A secondary pump controller 52, for example an EBARA A70W LCD controller, is disposed on a top surface 54 of the oven 46. A user may choose to control the pump through the primary or secondary controller.

In one embodiment, the system includes an oven 46 connected to the pump 32 via pipe 47. The oven 46 is, for example, a vacuum drying and outgassing oven. One example of the oven is manufactured by Oven Technology Incorporated (Albuquerque, N. Mex.). The oven 46 includes handle 48 for opening oven door 50 to the oven chamber (not shown). The oven also includes a controller, not shown here. Semiconductor fabrication equipment components, such as o-rings and internal chamber components comprising quartz, stainless steel, or silicon carbide (not shown), are placed within the chamber of the oven for drying and outgassing. The oven 46 is connected to pump 32 via pipe 47 which, in turn, is connected to pipe 34. Pipe 47 includes valve 43 for placing the oven into and out of fluid communication with the pump 32. The oven is supported by base elements 54 forming a part of a frame 56 (FIG. 4).

Figure 4:
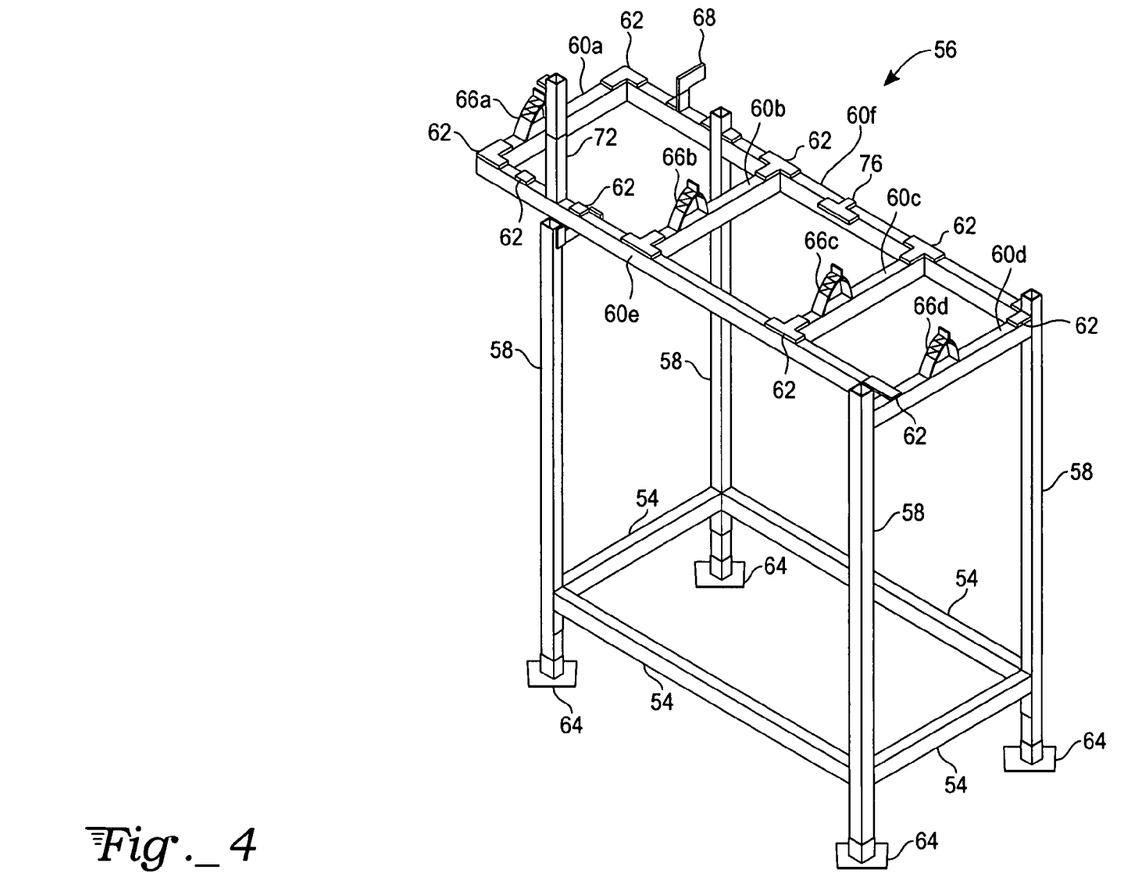
FIG. 4 is a perspective view of a frame of the system of FIG. 1.

With reference to FIG. 4, the exemplary frame 56 further includes pillars 58 and frame elements 60. Frame elements 60a-60f are connected via connection elements 62. In one example, connection elements are bolts. The frame 56 is, for example steel. Steel such as treated steel, including galvanized steel or Unistrut® (manufactured by Unistrut, Wayne, Mich.) may be used. Feet 64, located beneath the pillars 58, assist in distributing the load of the system 10. The manifold 12 is inserted within stirrups 66a-66d connected to frame elements 60a-60d, respectively. The stirrups 66 support the manifold 12. In one example, the frame 56 is 143 cm (56⅜ inches) high, 56 cm (22⅛ inches) wide, and 139 cm (54¾ inches) long. At the widest point the frame 56 is, for example, 67 cm (26³⁄₁₆ inches) wide. In one example, the stirrups 66 are disposed 29 cm (11⁷⁄₁₆ inches) from frame element 60e measured from a center print of the stirrup. Other frame dimensions may be used.

With reference to FIGS. 1 and 4, bracket 68 is utilized to support a flow regulator 70 (FIG. 1) which regulates the pressure of the fluid transported from the fluid source 20. In one example, the flow regulator 70 is a TESCOM 64-2600 series regulator (manufactured by Tescom Corp., Elk River, Minn.). A column 72 (FIG. 1) is used to support a flow controller 74 which regulates the fluid flow. In one example, the column 72 has a height of approximately 37.5 cm (14¾ inches). The fluid source 20 is connected to the flow regulator 70 via supply line 28. The flow regulator 70 is connected to the flow controller 74 via supply line 28 which is, for example, connected in series. The supply line 28 is connected to the opening of the capped end 16. Bracket 76 supports a Mini Convectron® power supply 78 (manufactured by Granville Phillips, Longmont, Colo.). The Mini Convectron Module 80, which measures the pressure of the manifold 12, is disposed on the manifold 12.

Figure 5A:
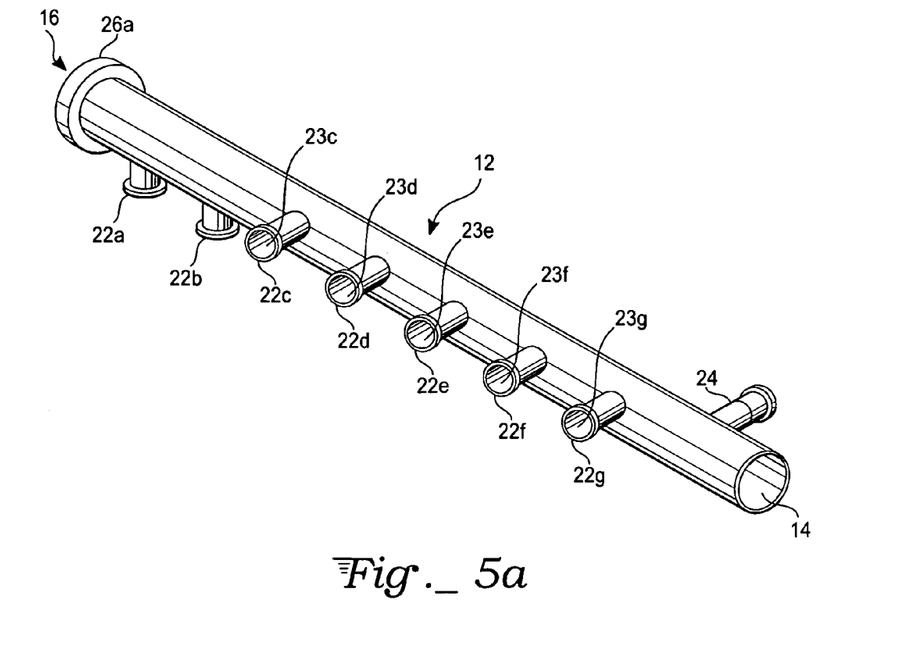
FIG. 5a is a perspective view of a manifold of the system of FIG. 1.
Figure 5B:
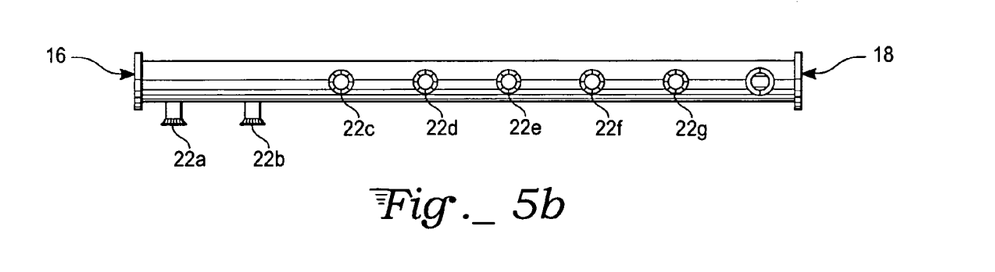
Figure 5C:
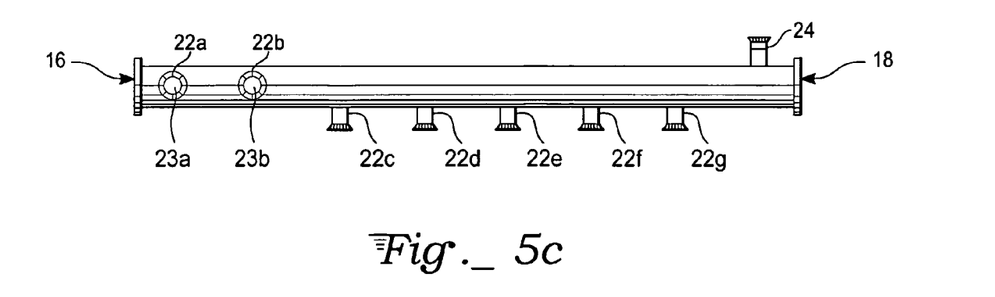
FIG. 5c is a top view of the manifold of FIG. 2b.

With reference to FIGS. 5a-5c, the manifold inlets 22a-22g are spaced to accommodate various types and sizes of semiconductor device fabrication equipment components. For example, inlets 22a-22g may be spaced apart to allow for connection of different types of components. In one example, inlets 22a and 22b are spaced apart by approximately 25.4 cm (10 inches), measured from a center point of each of the inlets. Such spacing allows for connection of a pair of semiconductor device fabrication equipment components, such as a pair of rotation assemblies 82a and 82b (FIG. 1), as will be described below. Pairs of inlets, for example, inlets 22b and 22c, 22c and 22d, 22d and 22e, 22e and 22f, and 22f and 22g, are spaced apart by, for example, 22.4 cm (8¹³⁄₁₆ inches), measured from a center point of one inlet of each pair of inlets to a center point of the next inlet of the pair. Spacing between a pair of inlets allows for connection of various components to the respective inlets. With reference to FIG. 1, spacing between inlets 22a and 22b allows for a pair of components, for example, a pair of rotation assemblies 82a and 82b, to be connected to inlets 22a and 22b. Spacing between inlets 22b and 22c allows for a pair of components, for example, rotation assembly 82b and a pressure control valve 84a, to be connected to inlets 22b and 22c, respectively. Spacing between inlets 22c and 22d allows for a pair of components, for example, pressure control valve 84a and a pressure control valve 84b, to be connected to inlets 22c and 22d. Spacing between inlets 22d and 22e allows for a pair of components, for example, pressure control valve 84b and a ball valve control valve 86a, to be connected in inlets 22d and 22e, respectively. Spacing between inlets 22d and 22e allows for a pair of components, for example, ball valve 86a and a ball valve 86b, to be connected to inlets 22d and 22e, respectively. Spacing between inlets 22f and 22g allows for a pair of components to be connected to each inlet, respectively. The example in FIG. 1 depicts pressure control valve 86b connected to inlet 22f and a cap 134e connected to inlet 22g. Instead of the cap, a component could be connected to inlet 22f.

The type of component connected to each inlet may vary. The spacing between inlets should be sufficient to accommodate the desired components. Inlets may be downwardly facing, as are inlets 22a and 22b, or frontwardly facing as are inlets 22c-22g. The spacing and orientation of the inlets 22 assists in the accommodation of one or more sets of components.

One or more components or various sets of components from semiconductor device fabrication equipment may undergo contaminant reduction at a single time. In the example of FIG. 1, three sets of components, each set including two components, namely one of a rotation assembly 82, a pressure control valve 84, and a chamber ball valve 86, are connected to the manifold for contaminant reduction. In the example shown in FIG. 1, downwardly facing inlets 22a and 22b may be dedicated to rotation assembly attachment. However, in the example, components connected to inlets 22c-22g are interchangeable in position at these inlets.

Additional semiconductor device fabrication equipment components having a surface, for example an internal surface, and at least one opening leading to the surface may be connected to the manifold valves to undergo contaminant reduction. The term surface may be used to encompass any surface of the component to undergo contaminant reduction.

Inlet 22a is spaced apart from flange 26a by, for example, 11.7 cm (4⅝ inches) from a center point of the inlet. Inlet 22g is spaced apart by, for example, 26.7 cm (10½ inches) from the flange 26b, measured from a center point of the inlet. Exhaust fitting 24 is spaced apart by, for example 9.68 cm (3¹³⁄₁₆ inches) from flange 26b, measured from a center point of the fitting.

Referring to FIGS. 1-3, six manifold valves 30a-30g are depicted connected to various components. Rotation assemblies 82a and 82b, which are depicted in representational form, are connected to manifold valves 30a and 30b, respectively, at an opening of each of the rotation assemblies leading to an internal surface of the rotation assembly. Rotation assemblies 82a and 82b include the same elements and are connected to the manifold 12 in the same manner, thus the elements and the connection will be explained only with regard to one rotation assembly.

Figure 6A:
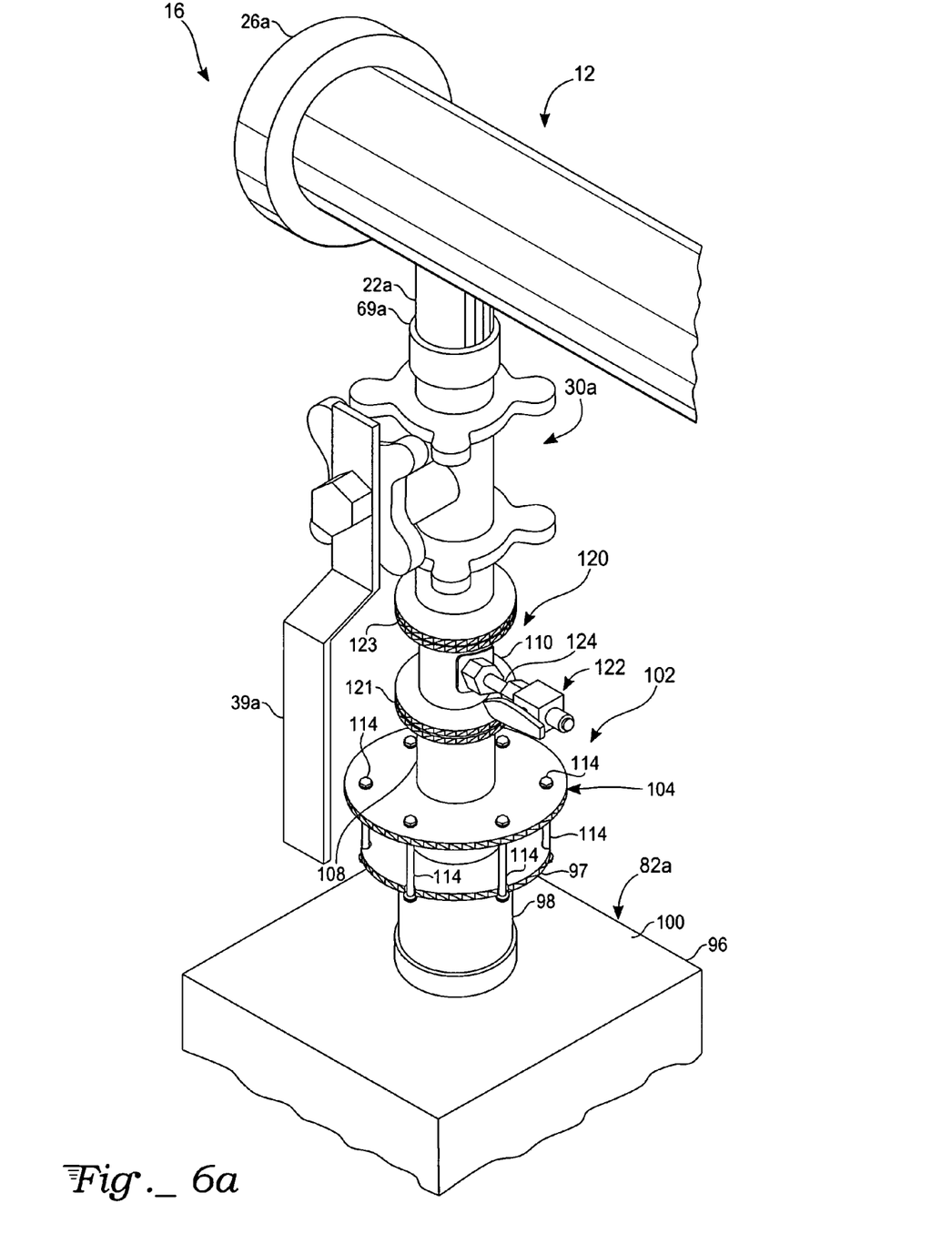
FIG. 6a is a partial perspective view of the system of FIG. 1.

Referring to FIG. 6a, manifold valve 30a is connected to downwardly facing inlet 22a at one end, and to rotation assembly 82a at another end. Downwardly facing inlet 22a assists in the connection of rotation assembly 82a to the manifold valve 30a, as the downwardly facing inlet supports a particular shape of the rotation assembly.

Figure 6B:
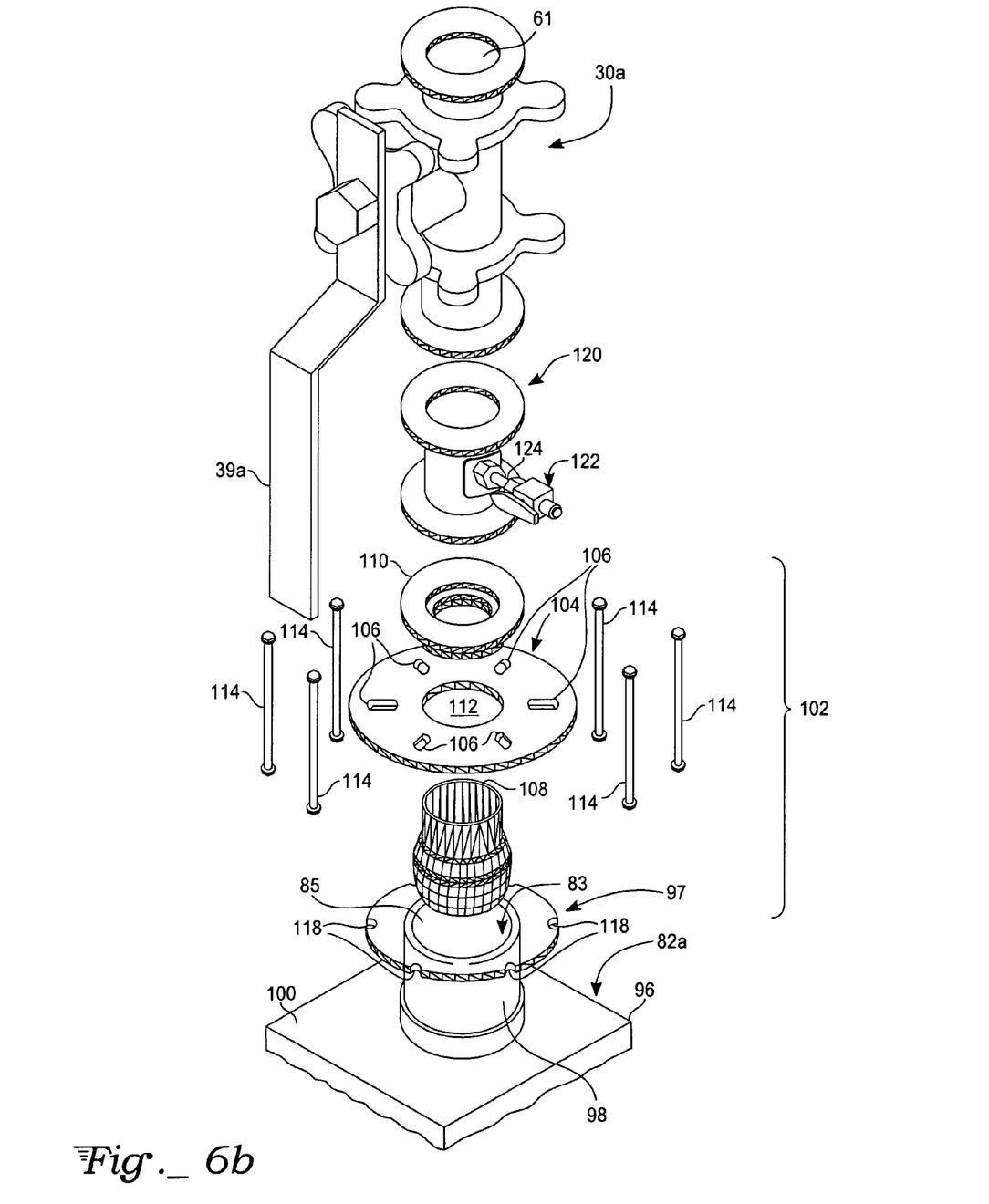

Referring to FIGS. 6a and 6b, rotation assembly 82a includes a rotation assembly body 96. A rotation assembly cup 98 having an opening 83 extending through the cup to an internal surface 85 of the rotation assembly to undergo contaminant reduction, is connected to a top surface 100 of the body 96. Rotation assembly flange 97 is connected to the cup 98.

Still referring to FIGS. 6a-6b, rotation assembly 82a is seen connected to manifold valve 30a via, for example, fitting 120 and ball joint 102. The fitting 120 is connected to the ball joint 102, at one end, and to the manifold valve 30a, at another end, via flange joints 121 and 123, respectively. The fitting 120 is connected to a valve 122 via tubing 124. The ball joint 102 includes a ball joint flange 104 with bolt openings 106, a male connector 108, and flange 110 which is for example, a KF flange. The male connector is inserted, at one end, within opening 83 of rotation assembly cup 98 of rotation assembly 82a. At another end, the male connector 108 is inserted through ball joint flange opening 112 and flange 110. Bolts 114 are inserted through openings 106 of the ball joint flange and notches 118 of rotation assembly flange 97 to secure the ball joint to the rotation assembly cup 98. Other types of connections, including other rotatable joints, may be utilized to connect each rotation assembly to one of the manifold valves.

Figure 7A:
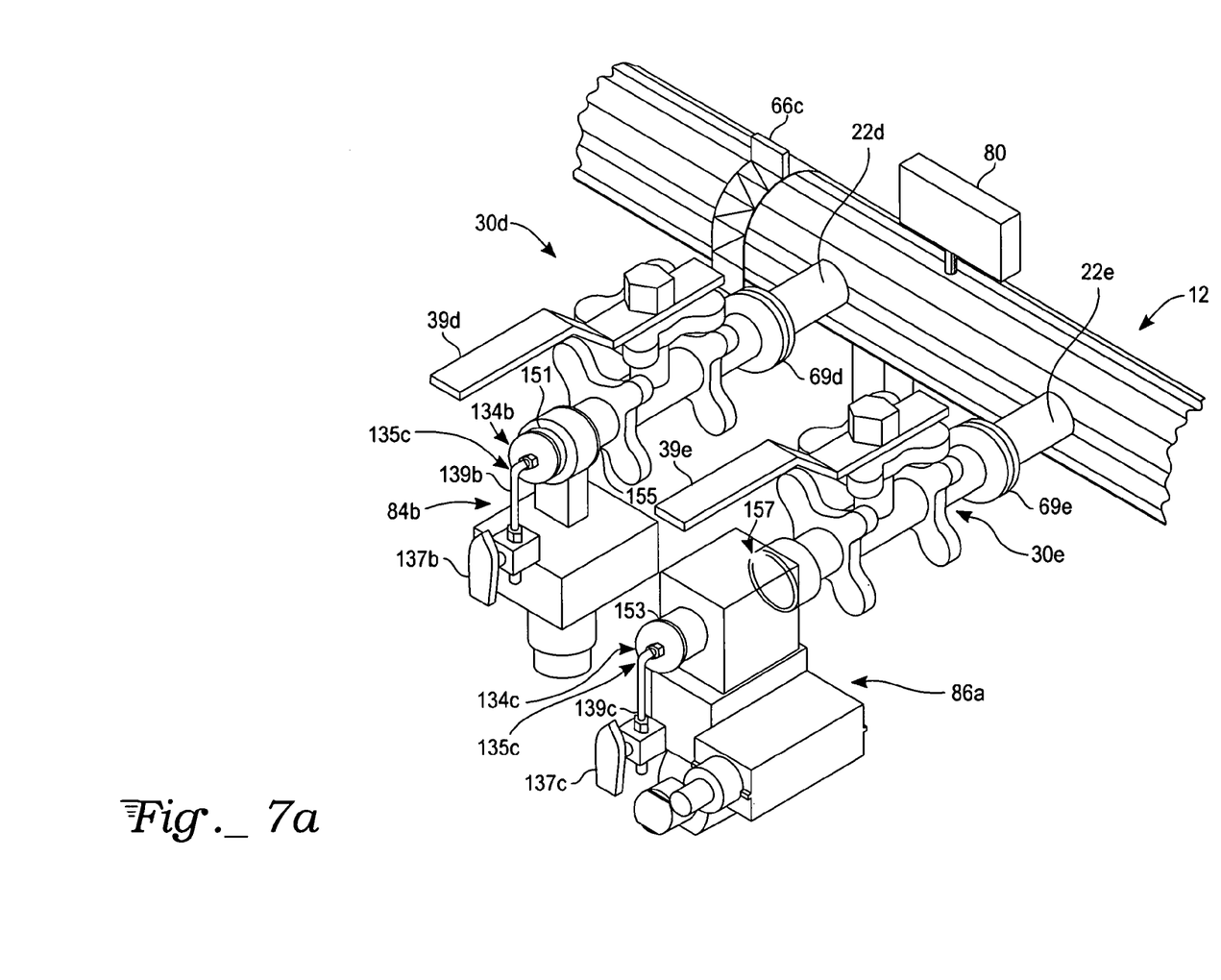
FIG. 7a is another partial perspective view of the system of FIG. 1.
Figure 7B:
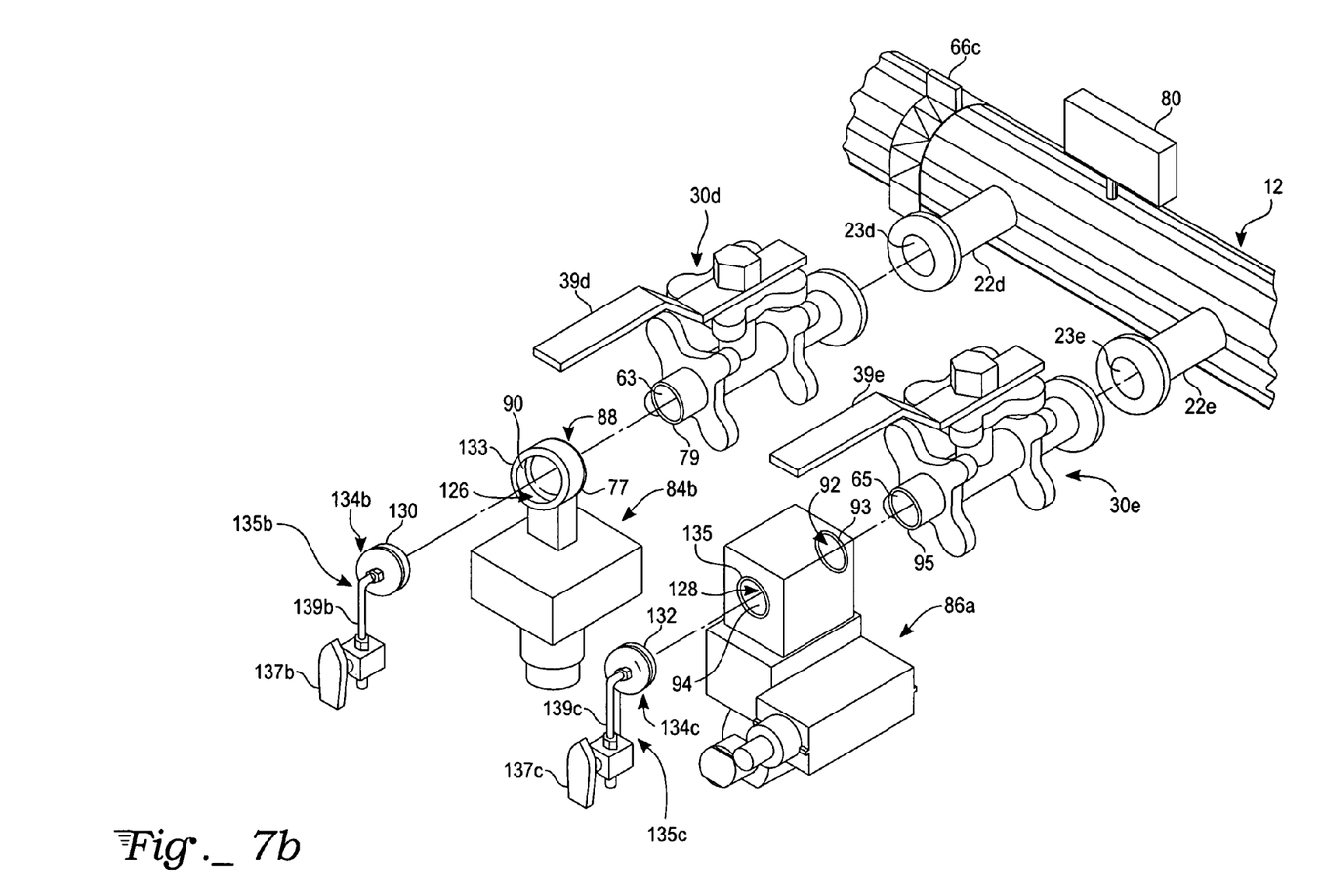

Referring back to FIG. 1, pressure control valves 84a and 84b, which are depicted in representational form, are connected to manifold 12 via manifold valves 30c and 30d, respectively. With reference to FIG. 7a and FIG. 7b, the connection of pressure control valve 84b to manifold 12 is depicted in detail. Pressure control valve 84a includes the same components as and is connected to manifold 12 in the same manner as pressure control valve 84b, thus the components and connection to the manifold 12 of the chamber ball valves will be described in detail with regard to one of the pressure control valves only. The components and connection of pressure control valve 84b to manifold 12 is as follows. Pressure control valve 84b is connected to manifold valve 30d at a first opening 88 of the pressure control valve leading to an internal surface 90, seen in FIG. 7b. In addition to first opening 88, pressure control valve 84b includes a second opening 126 to the interior surface 90. The end of the pressure control valve 84b connected to the manifold valve 30d is proximate the first opening 88 of the pressure control and includes a flange 77. Manifold valve 30d also includes a flange 79 which forms a flange connection or flange joint 155 (FIG. 7a) with flange 77. The flange connection is, for example, a KF40 flange connection.

The second opening 126 of pressure control valve 84b is closed during operation of the system to prevent fluid, such as atmospheric particles, from entering the system and to allow the system to operate under vacuum. Specifically, cap 134b of cap assembly 135b closes opening 126 (FIG. 7b) during operation of the system. Cap 134b includes a flange 130, which forms a flange connection 151 (FIG. 7a) with a flange 133 located on an end of the pressure control valve 84b proximate the second opening 126, and may comprise a metallic material.

Chamber ball valves 86a and 86b, which are depicted in representational form, are connected to manifold 12 via manifold valves 30e and 30f, respectively (FIG. 1). With reference to FIG. 7a and FIG. 7b, the connection of chamber ball valve 86a to manifold 12 is depicted in detail. Chamber ball valves 86a and 86b include the same components and are connected to manifold 12 in the same manner, thus the components and connection to the manifold 12 of the chamber ball valves will be described in detail with regard to one of the chamber ball valves only. The components and connection of chamber ball valve 86a to manifold 12 is as follows. Chamber ball valve 86a is connected to manifold valve 30e at a first opening 92 of the chamber ball valve leading to an internal surface 94, seen in FIG. 7b. In addition to first opening 92, chamber ball valve 86a includes a second opening 128 to the interior surface 94. The end of the chamber ball valve 86a connected to the manifold valve 30e is proximate the first opening 92 of chamber ball valve 86a and includes a flange 93. Manifold valve includes a flange 95 which forms a flange connection, or flange joint 157 (FIG. 7a), with flange 93. The flange connection is, for example, a KF40 flange connection.

The second opening 128 of chamber ball valve 86a is closed during operation of the system to prevent fluids from escaping the system and to allow the system to operate under vacuum. Specifically, cap 134c of cap assembly 135c closes opening 128 during operation of the system. Cap 134c includes a flange 132, which forms a flange connection 153 (FIG. 7a) with a flange 135 located on an end of the chamber ball valve 86a proximate the second opening 128, and may comprise a metallic material.

Referring to FIG. 2, cap assemblies 135a-135e are seen featuring valves, caps, and tubing. Valves 137a-137e are connected to the caps 134a-134e, respectively, via tubing 139a-139e. Gas may be vented to each component through the corresponding valve 137a-137e and via the tubing elements 139a-139e, as will be described below.

Where a manifold valve lacks a connected component, as with manifold valve 30g, a cap such as cap 134e, may be used to seal an opening of the manifold valve. A cap is not required to seal an opening of the manifold valve 30g, as the valve 30g may be placed in a closed position by adjustment with handle 39g (FIG. 1) to prevent fluid, such as atmospheric particles, from entering the manifold valve.

Still referring to FIG. 2, cap assembly 135e may be removed from manifold valve 30g so that a residual gas analyzer may be connected to manifold valve 30g to analyze gas within the manifold 12.

With reference to FIG. 1, in operation of the system, components desired to undergo contaminant reduction are connected to the manifold valves. In FIG. 1, components, including for example, one of a rotation assembly 82, a pressure control valve 84, and a chamber ball valve 86, are connected to the manifold valves 30a-30f. A purge fluid, such as nitrogen gas, an inert gas, or another type of gas or other purge substance, is introduced into the manifold 12 for reducing contaminants present on the components. The following example is described with the use of nitrogen, however, other purge fluids may be used. Nitrogen gas is advantageous as a purge fluid as it assists in the removal of oxygen from surfaces of the components in the system. In one example, nitrogen is contained within the fluid source 20 at, for example, a pressure ranging from approximately 3620 Torr to 5171 Torr (70 psig to 100 psig). Supply line 28 transports the nitrogen from the nitrogen source 20 to flow regulator 70 which regulates the flow of gas to, for example, approximately 259 Torr±52 Torr (5±1 psig). The regulated nitrogen gas is transported from the nitrogen regulator 70 to the flow controller 74. From the flow controller 74, the gas is transported to the opening of capped end 16 via supply line 28. Nitrogen is introduced into the main passageway 14 as well as to the connected components via the plurality of inlets 22a-22f and manifold valves 30a-30f. In the example of FIG. 1, manifold valve 30g lacks a component, but may still be placed in fluid communication with the nitrogen, as described above. Inlets and manifold valves include passageways through which fluid is transported. Inlets 22a-22g include passageways 23a-23g, seen in FIGS. 5a-5c. With regard to manifold valves 30a, 30d and 30e, passageways are seen as elements 61, 63, and 65 (FIG. 6b and FIG. 7b), respectively. The other manifold valves include passageways which are not depicted. The fluid travels along the passageways of the inlets and manifold valves and reaches the internal surfaces of the components. With the introduction of the purge fluid under vacuum, oxygen is removed from the internal surfaces of the components. Fluid, such as oxygen gas, removed from the surfaces, is pumped out of the components 82a, 82b, 84a, 84b, 86a, and 86b, inlets 22a-22g and manifold valves 30a-30g, through the exhaust pipe 24 connected to the pump 32.

The system operates under a vacuum. In one example, the manifold pressure is 25±5 Torr (0.5±0.1 psia) and the manifold flow rate is 20±2 slm (42±4 scfh). A variety of manifold pressures and flow rates may be used, however, low pressures are typically desired.

The manifold valves 30a-30g of the system operate independently of each other to place connected components, such as components 82, 84 and 86, into and out of fluid communication with the manifold 12. Therefore, an advantage of the system of the present invention is that one component may be removed without shutting down the entire system 10. Specifically, the manifold valve 30 connected to the component to be removed may be closed such that the component is no longer in fluid communication with the connected inlet 22. The component may then be removed from the system and utilized for semiconductor device manufacturing without disrupting the vacuum.

Further, because a plurality of components may undergo contaminant reduction by the system 10 of the present invention, a set of components from, for example, one reaction chamber, may be removed after contaminant reduction while another set from another chamber, for example, are still undergoing contaminant reduction. Additionally, replacement components may be connected to the manifold 12 to replace the removed set. In this manner, components belonging to semiconductor device manufacturing equipment may efficiently undergo contaminant reduction.

When the system is in use, a vacuum environment typically exists within the system, including the manifold 12 and the connected components. Therefore, before a component is removed from the system, it is desirable that the component is slowly vented out to atmosphere. Valves connected to the rotation assemblies are opened slowly to vent out the components to atmosphere before removal. For example, valve 122, connected to rotation assembly 82a via fitting 120 (FIGS. 6a-6b), is opened to vent out rotation assembly 82a. Valve 123, connected to rotation assembly 82b, is opened to vent out rotation assembly 82b. Valves 137a-137e (FIG. 1) of cap assemblies 135a-135e (FIG. 2), which are connected to pressure control valves 84a and 84b, chamber ball valves 86a and 86b, and manifold valve 30g, respectively, are opened slowly to vent out the components to atmosphere before removal or to test the composition of gas within the manifold valve 12. Before opening each of the valves, the corresponding manifold valve is closed.

While the connected components are undergoing contaminant reduction, additional components, such as o-rings, may be disposed within the oven 46 for moisture reduction and outgassing. In one example, the oven is set at 65° C. and has an oven pressure of 25±5 Torr (0.5±0.1 psia). In one example, the oven flow rate is 14.1±4.7 slm (30±10 scfh). The temperature and pressure may vary.

When the components have undergone contaminant reduction, they are removed from the system and are ready for use. In one example, the components are connected to the manifold until it is time for use. Components undergoing contaminant reduction in the system of the present invention, in one example, remain under vacuum and exposed to the purge fluid for 30-35 days. In another example, the components are stored in, for example, a nitrogen environment until it is time for use. The amount of time for which the components undergo contaminant reduction may vary.

Although certain embodiments have been described for illustration, a skilled artisan will recognize various means for accomplishing a similar purpose. For example, valve handles 39 imply manual control means for connecting components to manifold 12. However, automated, computer and state machine-controlled valve control is considered to be within a scope of the present invention. Therefore, the scope shall only be determined by way of the appended claims.

What is claimed is:

1. A system for contaminant reduction of physical components, the system comprising:
    a manifold having a main passageway configured to accept a purge fluid, the main passageway including a plurality of inlets in fluid communication with the main passageway and an exhaust opening in fluid communication with the main passageway; and
    a plurality of manifold valves, each of the plurality of manifold valves having a first end and a second end, the first end being coupled to one of the plurality of inlets, the second end being configured to couple to a component having a contaminated surface, and each of the plurality of manifold valves being operable to place one of the plurality of inlets into and out of fluid communication with the surface of the component.

2. The system of claim 1 wherein the main passageway includes first and second capped ends, the plurality of inlets being disposed between the capped ends, the first capped end being configured to accept the purge fluid.

3. The system of claim 1 further comprising a plurality of caps, each of the caps being removably connectable to the second end of one of the plurality of manifold valves.

4. The system of claim 1 wherein:
    each manifold valve is a ball valve; and
    the component is a rotation assembly or a chamber ball valve or a pressure control valve of semiconductor device fabrication equipment.

5. The system of claim 1 further comprising a frame to support the manifold.

6. The system of claim 1 wherein the purge fluid is nitrogen.

7. The system of claim 1 wherein the purge fluid is an inert fluid.

8. The system of claim 1 further comprising a flow regulator and a flow controller coupled to the main passageway to regulate a flow of the purge fluid.

9. The system of claim 1 wherein:
    the exhaust opening includes an exhaust fitting disposed downstream from the plurality of inlets, the exhaust fitting being in fluid communication with the main passageway; and
    further comprising a pump coupled to the exhaust fitting to pump fluid from the manifold.

10. An apparatus comprising:
    a manifold having a fluid passageway and being configured to accept a purge fluid, the manifold having a plurality of inlets and an exhaust opening in fluid communication with the fluid passageway; and
    a plurality of manifold valves, each of the plurality of manifold valves having a first end and a second end, the first end being coupled to one of the plurality of inlets and each of the second ends being configured to be coupled to a component of semiconductor device fabrication equipment, each of the plurality of manifold valves being independently operable to place one of the components into and out of fluid communication with one of the plurality of inlets and the fluid passageway.

11. The apparatus of claim 10 further comprising a plurality of caps, each of the plurality of caps being removably connectable to the second end of one of the plurality of manifold valves.

12. The apparatus of claim 10 wherein:
    the fluid passageway includes first and second capped ends, the plurality of inlets being disposed in between the capped ends, the first capped end being configured to accept the purge fluid;

each manifold valve is a ball valve; and
the component is a rotation assembly or a chamber ball valve or a pressure control valve having a contaminated surface.

13. The apparatus of claim 10 further comprising:
a frame to support the manifold;
a flow regulator and a flow controller to regulate a flow of the purge fluid;
an exhaust fitting coupled to the exhaust opening and disposed downstream from the plurality of inlets, the exhaust fitting being in fluid communication with the fluid passageway of the manifold; and
a pump coupled to the exhaust fitting to pump fluid from the fluid passageway of the manifold.

14. A system for contaminant reduction of physical components, the system comprising:
a manifold having a main passageway configured to accept a purge fluid, the manifold having a plurality of inlets in fluid communication with the main passageway and an exhaust opening in fluid communication with the main passageway; and
a plurality of manifold valves, each of the plurality of manifold valves having a first end coupled to one of the plurality of inlets and a second end to be coupled to a component of semiconductor device fabrication equipment.

15. The system of claim 14 wherein:
the main passageway includes first and second capped ends, the plurality of inlets being disposed in between the capped ends, the first capped end being configured to accept the purge fluid;
each manifold valve is a ball valve; and
the component is a rotation assembly or a chamber ball valve or a pressure control valve having a contaminated surface.

16. The system of claim 14 further comprising:
a plurality of caps, each of the caps being removably connectable to the second end of one of the plurality of manifold valves;
a frame to support the manifold;
a flow regulator and a flow controller to regulate a flow of the purge fluid;
an exhaust fitting coupled to the exhaust opening and disposed downstream from the plurality of inlets, the exhaust fitting being in fluid communication with the main passageway of the manifold; and
a pump coupled to the exhaust fitting to pump fluid from the main passageway of the manifold.

17. A method comprising:
releasing a purge fluid into a main passageway of a manifold that is in fluid communication with a first component through a first inlet and a first manifold valve and with a second component through a second inlet and a second manifold valve; and
pumping fluid from the main passageway of the manifold.

18. The method of claim 17 wherein releasing a purge fluid includes releasing an inert gas or nitrogen gas into the main passageway of the manifold.

19. The method of claim 17 wherein pumping fluid from the main passageway of the manifold includes pumping fluid from the main passageway of the manifold to maintain a vacuum in the main passageway of the manifold.

20. The method of claim 17 further comprising removing the first component from fluid communication with the main passageway while the second component is undergoing contaminant reduction.

21. The method of claim 20, further comprising:
closing the first manifold valve such that the first component is no longer in fluid communication with the main passageway; and
venting the first component to atmosphere before removing the first component.

22. The method of claim 17 wherein the first component and the second component are each a rotation assembly or a chamber ball valve or a pressure control valve of semiconductor device fabrication equipment having a contaminated surface.

23. The method of claim 17, further comprising shutting off a third manifold valve in fluid communication with the main passageway at a first end of the third manifold valve through a third inlet in the main passageway to block fluid communication between the main passageway and a second end of the third manifold valve.

24. The method of claim 17, further comprising regulating a flow of the purge fluid.

25. A method comprising:
coupling a first component to a first end of a first manifold valve, a second end of the first manifold valve being coupled to a first inlet in a manifold in fluid communication with a fluid passageway of the manifold;
coupling a second component to a first end of a second manifold valve, a second end of the second manifold valve being coupled to a second inlet in the manifold in fluid communication with the fluid passageway of the manifold;
releasing a purge fluid into the fluid passageway of the manifold; and
pumping fluid from the fluid passageway of the manifold.

26. The method of claim 25, wherein:
releasing a purge fluid includes releasing an inert gas or nitrogen gas into the fluid passageway of the manifold; and
further comprising regulating a flow of the purge fluid.

27. The method of claim 25, further comprising:
closing the first manifold valve such that the first component is no longer in fluid communication with the fluid passageway of the manifold;
venting the first component to atmosphere; and
removing the first component from the first end of the first manifold valve while the second component is undergoing contaminant reduction.

28. The method of claim 25, further comprising shutting off a third manifold valve in fluid communication with the fluid passageway of the manifold at a first end of the third manifold valve through a third inlet in the fluid passageway of the manifold to block fluid communication between the fluid passageway of the manifold and a second end of the third manifold valve.

* * * * *